(12) United States Patent
Toyoshima et al.

(10) Patent No.: US 7,627,255 B2
(45) Date of Patent: Dec. 1, 2009

(54) SATELLITE INFORMATION AUTONOMOUS DISTRIBUTION SATELLITE, SATELLITE INFORMATION COLLECTING SYSTEM, AND SATELLITE TERRESTRIAL TEST SYSTEM

(75) Inventors: Morio Toyoshima, Tokyo (JP); Yoshinori Arimoto, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 823 days.

(21) Appl. No.: 11/177,438

(22) Filed: Jul. 11, 2005

(65) Prior Publication Data

US 2006/0179456 A1 Aug. 10, 2006

(30) Foreign Application Priority Data

Sep. 7, 2004 (JP) ............................. 2004-259758

(51) Int. Cl.
*H04B 10/10* (2006.01)
(52) U.S. Cl. ...................................... 398/170
(58) Field of Classification Search .......... 398/168–170
See application file for complete search history.

(56) References Cited

U.S. PATENT DOCUMENTS 3,151,295 A * 9/1964 Haviland ........................ 455/9

5,909,299 A * 6/1999 Sheldon et al. ............. 398/125

FOREIGN PATENT DOCUMENTS

JP 2004-98959 4/2004

OTHER PUBLICATIONS

Charles M. Swenson et al., "Low Power FLC-based Retromodulator Communications System", Proc. SPIE, vol. 2990, pp. 296-310, 1997.
G. C. Gilbreath et al., "large-aperture multiple quantum well modulating retroflector for free-space optical data transfer on unmanned aerial vehicles", Optical Engineering, vol. 40, No. 7, pp. 1348-1356, Jul. 2001.

* cited by examiner

*Primary Examiner*—Leslie Pascal

(57) ABSTRACT

In order to provide a satellite information autonomous distribution satellite capable of collecting attribute information for satellites after failure or damage occurs at or to the satellite, an information collection device is operated by a second power supply provided independently from the first power supply operating the satellite bus system, is provided separately from the satellite bus system, and collects and stores attribute information. The light receiver is provided separately from the satellite bus system and forms a prescribed control signal when light sent from the information collection station is received. The reflecting type light modulating device is operated by the second power supply, is provided separately from the satellite bus system, and transmits reflected light superimposed with a modulation signal containing attribute information in the reflected waves using this modulation signal when a modulation signal is formed based on attribute information stored in the information collection device according to the shape of the control signal.

16 Claims, 10 Drawing Sheets

SATELLITE INFORMATION AUTONOMOUS DISTRIBUTION SATELLITE, SATELLITE INFORMATION COLLECTING SYSTEM, AND SATELLITE TERRESTRIAL TEST SYSTEM

CROSS-REFERENCE TO RELATED APPLICATIONS

This application claims the conventional priority based on Japanese Application Serial No. 2004-259758, filed on Sep. 7, 2004, the disclosures of which are incorporated herein by reference.

BACKGROUND OF THE INVENTION

1. Field of the Invention

This invention relates to a satellite information autonomous distribution satellite, satellite information collection system and satellite terrestrial test system, and more particularly to a satellite information autonomous distribution satellite, satellite information collection system and satellite terrestrial test system capable of collecting satellite attribute information even after something goes wrong or hinders the satellite, or even in terrestrial testing prior to launching.

2. Description of the Related Art

Communication between various satellites launched into orbit and terrestrial stations is usually carried out using electromagnetic waves. For example, it is possible to acquire various information (status information or attribute information, hereafter referred to as attribute information) for the satellite using telemetry command lines from a satellite. As a result, it is possible to be aware of the state of the satellite at this time, and it is possible to monitor, analyze and study etc. the state of the satellite in orbit.

However, in the event that something goes wrong with the satellite such as, for example, a problem such as it no longer being possible to use a transponder, etc., it is often not possible to acquire attribute information for the satellite using the directory command line. Because of this, with regards to satellite trouble and the state and cause of a malfunction, it is only possible to go as far as deducing the state and cause of this based on the conditions etc. up to the time of the trouble or malfunction.

Further, means for retrieving target satellites that are the subject of abandonment or recovery have been proposed (refer to Japanese Patent Laid-open Publication No. 2004-098959). If the malfunctioning satellite or satellite waste etc. is recovered using a separately launched working satellite, it is possible to directly investigate the cause of problems or malfunctioning in the malfunctioning satellite etc.

It is not possible to acquire sufficient attribute information from before the occurrence of the problem of malfunction of the satellite because the communication speed of the directory command line is low. In particular, because it is not possible to acquire sufficient attribute information for the conditions etc. up to the occurrence of the problem or malfunction, it is not possible to deduce the cause etc. of the malfunction of the satellite etc. in a fixed proportion of cases. Further, there is little (or no) attribute information regarding specific problems for which it was originally thought that recovery was possible, so that recovery is not possible, or it may not be possible to cause the satellite to operate due to it being in an involuntary state (light load mode (LLM; Low Load Mode) states).

Further, after a satellite has been subjected to trouble or has malfunctioned, communication means for a satellite for which trouble has occurred so that transponders cannot be used or for malfunctioning satellites are cut, and attribute information for the satellite cannot be acquired using a directory command line. It is therefore not possible to acquire attribute information thereafter, and it is therefore only possible to extrapolate the cause etc. of the problem etc. with the satellite, or it is not even possible to extrapolate the cause. In this event, even if it is possible to extrapolate the cause etc. to a certain degree of accuracy from past experience, it is only ever possible to assume the specific cause.

On the other hand, if the malfunctioning satellite is recovered, it is possible to reliably know the cause of the satellite malfunction but this tends to be prohibitively expensive. This is therefore not appropriate for all satellites. Further, it is not possible to recover satellites that are still operating in orbit even though they may be somewhat damaged.

In addition to the above, various tests are carried out on a satellite terrestrially prior to launch of the satellite. In this event, as it is not possible to use a telemetry command line, a cable, for example, is connected between a satellite arranged in a vacuum chamber and external test apparatus, and various test data is acquired. Unfortunately, with this method it is necessary to annoyingly carry out the cabling every time a test takes place. Further, the load here is substantial because it is necessary to provide a different cable connection section every satellite at test apparatus such as the vacuum chamber.

SUMMARY OF THE INVENTION

It is an object of the present invention to provide a satellite information autonomous distribution satellite capable of collecting attribute information for a satellite after a problem or malfunction as occurred with a satellite.

It is another object of the present invention to provide a satellite information collection system capable of collecting attribute information for a satellite after a problem or malfunction has occurred with a satellite.

It is still another object of the present invention to provide a satellite terrestrial test system capable of testing for whether or not problems or malfunctions have occurred with a satellite prior to launch with only a light workload.

A satellite information autonomous distribution satellite of the present invention comprises a satellite bus system for a satellite, a first power supply to cause the satellite bus system to operate, a second power supply provided independently from the first power supply, an information collection device operated by the second power supply and provided independently from the satellite bus system, to collect and store attribute information for the satellite, a light receiver provided independently from the satellite bus system, to form a prescribed control signal when prescribed light is received, and a reflecting type light modulating device operated by the second power supply and provided independently from the satellite bus system, to transmit reflected light modulated by superimposing a modulation signal onto reflected waves of light when the prescribed light is received. The reflecting type light modulating device sends reflected light constituted by reflected light where the attribute information is superimposed on the prescribed light using the modulation signal when a modulation signal is formed based on the attribute information stored in the information collection device according to the forming of the control signal.

The satellite information autonomous distribution satellite of the present invention further comprises a satellite bus system for a satellite, a first power supply to cause the satellite bus system to operate, a second power supply provided independently from the first power supply, an information collection device operated by the second power supply and provided independently from the satellite bus system, to collect and store attribute information for the satellite, and an information distribution device operated by the second power supply, provided independently from the satellite bus system, to transmit a signal containing the attribute information stored in the information collection device.

A satellite information collection system of the present invention comprises an information collection station and a satellite in orbit. The information collection station further includes a light transmitter to transmit prescribed light, and a light receiver to receive reflected light resulting from the prescribed light being reflected by the satellite. The satellite further includes a satellite bus system for the satellite, a first power supply to cause the satellite bus system to operate, a second power supply provided independently from the first power supply, an information collection device operated by the second power supply and provided independently from the satellite bus system, to collect and store the attribute information for the satellite, a light receiver provided independently from the satellite bus system, to form a prescribed control signal when the prescribed light is received, and a reflecting type light modulating device operated by the second power supply and provided independently from the satellite bus system, to transmit reflected light modulated by superimposing a modulation signal onto reflected waves of light when the prescribed light is received. The reflecting type light modulating device sends reflected light constituted by reflected light where the attribute information is superimposed on the prescribed light using the modulation signal when a modulation signal is formed based on the attribute information stored in the information collection device according to the forming of the control signal.

A satellite terrestrial test system of the present invention comprises a test station and an un-launched satellite. The test station further includes a light transmitter to transmit prescribed light, and a light receiver to receive reflected light resulting from the prescribed light being reflected by the satellite. The satellite further includes a satellite bus system for the satellite, a first power supply to cause the satellite bus system to operate, a second power supply provided independently from the first power supply, an information collection device operated by the second power supply and provided independently from the satellite bus system, to collect and store the attribute information for the satellite, a light receiver provided independently from the satellite bus system, to form a prescribed control signal when the prescribed light is received, and a reflecting type light modulating device operated by the second power supply and provided independently from the satellite bus system, to transmit reflected light modulated by superimposing a modulation signal onto reflected waves of light when the prescribed light is received. The reflecting type light modulating device sends reflected light constituted by reflected light where the attribute information is superimposed on the prescribed light using the modulation signal when a modulation signal is formed based on the attribute information stored in the information collection device according to the forming of the control signal.

According to the satellite information autonomous distribution satellite and satellite information collecting system of the present invention, a reflecting type light modulating device operated by a second power supply provided independently from a first power supply to operate the satellite bus system is provided. The reflecting type light modulating device transmits reflected light superimposed with the attribute information of the satellite in the case of forming a modulation signal based on attribute information according to a received signal for prescribed light sent from the information collection station. It is then possible for the reflecting type light modulating device to obtain attribute information containing information showing failure conditions from the satellite by receiving reflected waves of light sent from the information collection station after failure has occurred in the satellite bus system of a first power supply because the reflecting type light modulating device is operated by the second power supply.

It is therefore possible to obtain sufficient attribute information as necessary optical communication with a data transfer rate of a sufficiently high speed when the satellite is in a normal operating state (before failure or damage occurs at the satellite). As a result, it is possible to obtain sufficient attribute information for conditions etc. up to the point of failure or damage and an accurate analysis of the causes etc. of the failure etc. of the satellite can be achieved. Further, with failures where, despite recovery being possible, recovery has not been possible because attribute information cannot be obtained, it is now possible to obtain sufficient attribute information. This means that restoration is possible, and situations where operation of the satellite in light load operation occurs can be reduced.

Further, it is possible to obtain attribute information for a satellite after failure or damage to the satellite has occurred even when communication means are cut. It is therefore possible to obtain attribute information thereafter and it is possible to analyze the cause of satellite failures etc. In particular, it is possible to obtain attribute information for processes occurring in failures etc.

It is also possible to obtain attribute information for before and after the occurrence of failure for all satellites without recovering the satellite etc. for which the failure has occurred. Further, it is also possible to obtain attribute information for satellites that have malfunctioned slightly but are still in orbit without salvaging the satellite so that recovery may then be possible based on this attribute information.

According to the satellite information autonomous distribution satellite of the present invention, an information distribution device operated by a second power supply provided independently from a first power supply to operate the satellite bus system is provided. Because the information distribution device is operated by the second power supply, it is possible to obtain attribute information containing information indicating conditions for the failure from the satellite after the occurrence of a failure etc. at the satellite bus system or first power supply.

It is therefore, as described above, possible to obtain sufficient attribute information for conditions etc. up the point of failure of or damage to the satellite so that accurate analysis is possible. Recovery is also possible in inconvenient situations where recovery was not previously possible because attribute information could not be obtained, and situations where the satellite operates in a light load mode are reduced. Further, it is possible to analyze the causes of failure of the satellite in an extremely accurate manner because attribute information for the satellite can be acquired after the occurrence of failure of or damage to the satellite. It is therefore possible to obtain attribute information for before and after the occurrence of failure etc. for all satellites and recovery is possible for satellites that have malfunctioned slightly but are still in orbit based on this acquired attribute information.

According to the satellite terrestrial test system of the present invention, it is possible to transmit reflected light superimposed with the attribute information of the satellite in the case of forming a modulation signal based on attribute information according to a received signal for prescribed light sent from the information collection station using the reflecting type light modulating device. Acquisition of various data is therefore possible using optical communication with a satellite arranged, for example, within a vacuum chamber for satellite tests on land prior to launch of a satellite. It is therefore no longer necessary to make a connection with external test equipment using a cable or to provide different connection units for different cables at test equipment such as, for example, a vacuum chamber etc. ever satellite. The data acquisition interface for acquisition of the satellite test data can therefore be consolidated regardless of the type of satellite.

BRIEF DESCRIPTION OF THE PREFERRED EMBODIMENTS

DETAILED DESCRIPTION OF THE PREFERRED EMBODIMENTS

Figure 1:
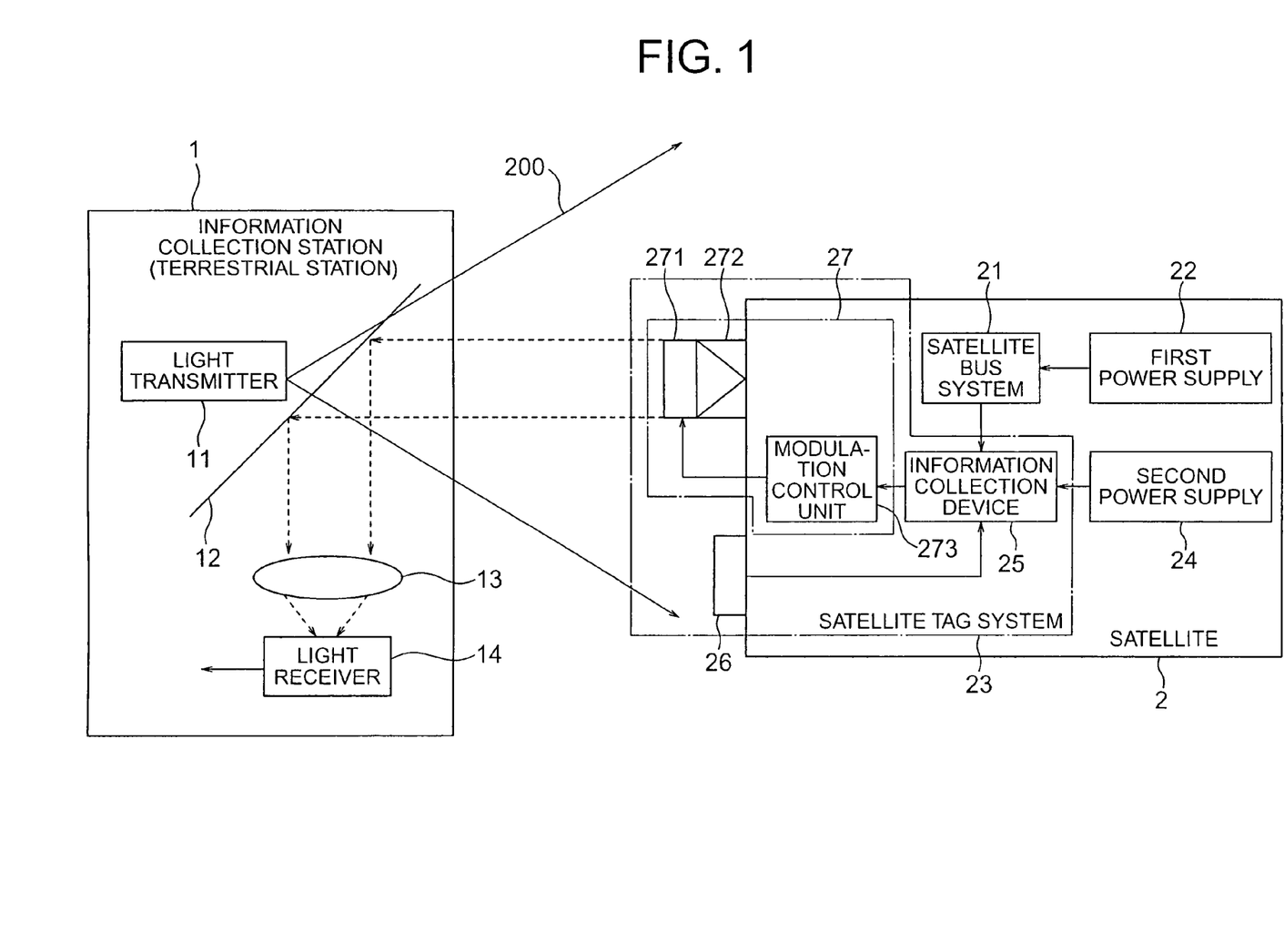
FIG. 1 is a view showing the structure of a satellite information collection system of the present invention.
Figure 2:
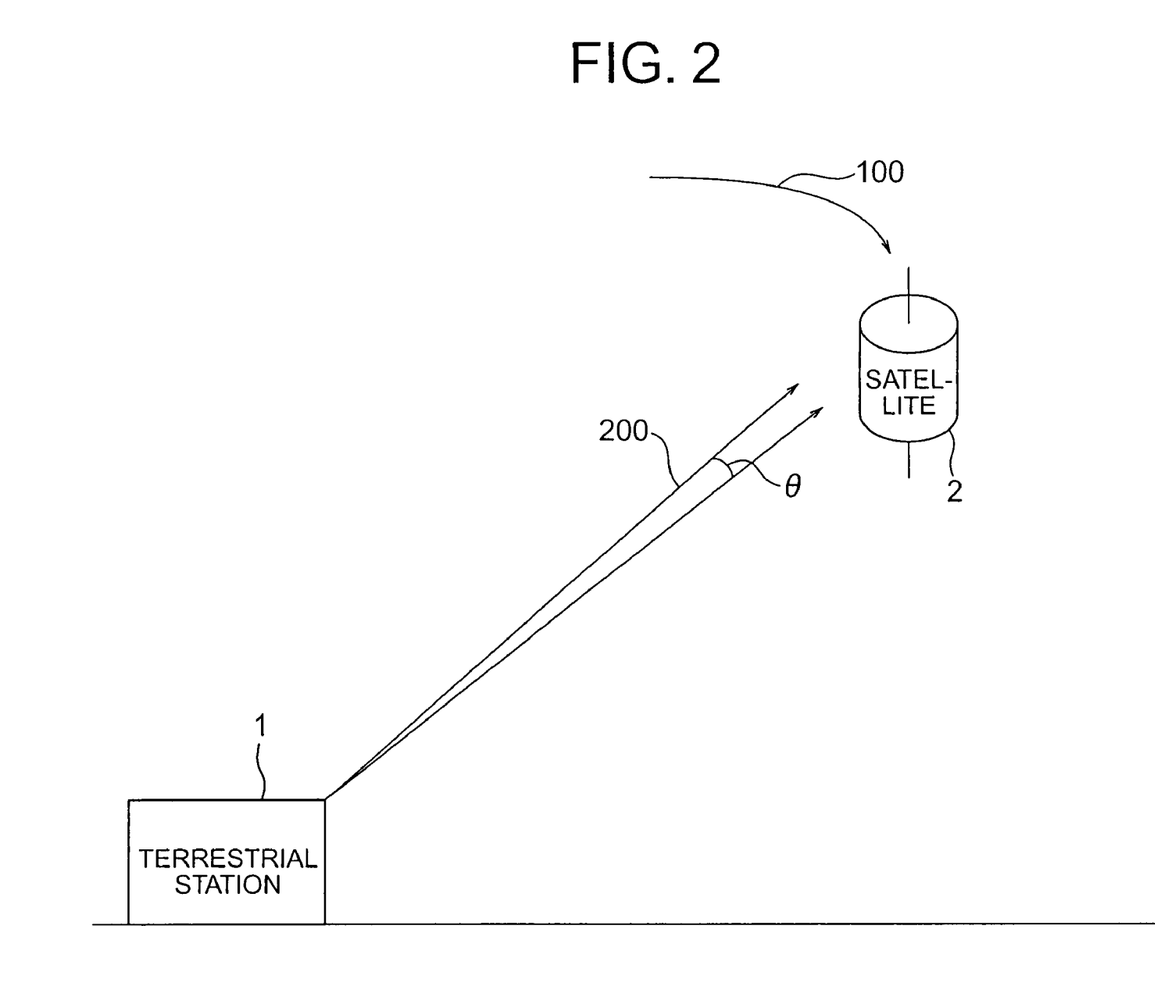
FIG. 2 is a view illustrating a satellite information collection system of the present invention.

FIG. 1 is a view of a structure for a satellite information collection system, and shows a structure for a satellite information collection system of the present invention. In the example in FIG. 1, the satellite information collection system comprises an information collection station 1 (hereinafter referred to as terrestrial station 1) provided terrestrially, and a satellite (man-made satellite) 2 for a launch orbit 100, as shown in FIG. 2. The satellite 2 is a satellite information autonomous distribution satellite according to the present invention.

The terrestrial station 1 comprises a light transmitter 11 and a light receiver 14. The light transmitter 11 transmits (irradiates) prescribed (i.e. predetermined) light 200 towards the satellite 2. Laser light 200 of a prescribed wavelength (other names may also be used hereafter) is employed as the prescribed light 200. In FIG. 1, the light irradiated from the light transmitter 11 is shown to diverge at a certain angle but in reality the light propagates in a rectilinear manner with almost no divergence (in reality, there is beam divergence of θ, for example, 50μ radians as shown in FIG. 2). FIG. 1 shows a reflection-type shows a reflecting-type light-modulating device 27 entering the bus of the laser light 200 irradiated from a light transmitter 11.

The light receiver 14 receives reflected light (receives light) of the prescribed light 200 reflected by the satellite 2. Because of this, the light receiver 14 is equipped with a half mirror 12 and a light-focusing lens 13. The light irradiated from the light transmitter 11 is outputted towards the satellite 2 on the trajectory 100 via the half-mirror 12. On the other hand, the reflected light reflected by the satellite 2 is made to change direction by a half-mirror 12, is made incident to the light-focusing lens 13 and is incident to the light receiver 14. As a result of using the laser light 200, it is possible to carry out sufficient optical communication between a terrestrial station 1 and a satellite 2 even over distances of a few hundreds kilometers. When the distance between the half-mirror 12 and the light-focusing lens 13 is close (for example, in the case of communication with the satellite of FIG. 9 or in the case of the terrestrial testing of FIG. 10) this may be omitted.

The satellite 2 is in addition to a basic structure of a satellite bus system 21 and a (first) power supply 22, according to the present invention, the satellite 2 is equipped with a satellite tag system 23 and (second) power supply 24. The satellite tag system 23 is equipped with an independent power supply 24 and is a system that is independent from the satellite bus system 21 and is therefore capable of autonomous operation, and is capable of collecting attribute information for the satellite 2 without being dependent on the side of the satellite bus system 21. As a result, the satellite 2 can be taken to be a satellite information autonomous distribution satellite. The satellite tag system 23 is provided independently from the satellite bus system 21, and comprises an information collection device 25, light receiver (light receiver) 26, and reflecting type light modulating device 27.

In this example, the satellite tag system 23 is protected by a metal-shielding plate (not shown) as with the satellite bus system 21. The parts making up the satellite tag system 23 may be radiation-resistant parts or may have functional redundancy. As a result, the radiation-resistant characteristics of the satellite tag system 23 are reinforced and reliability is increased.

Figure 3:
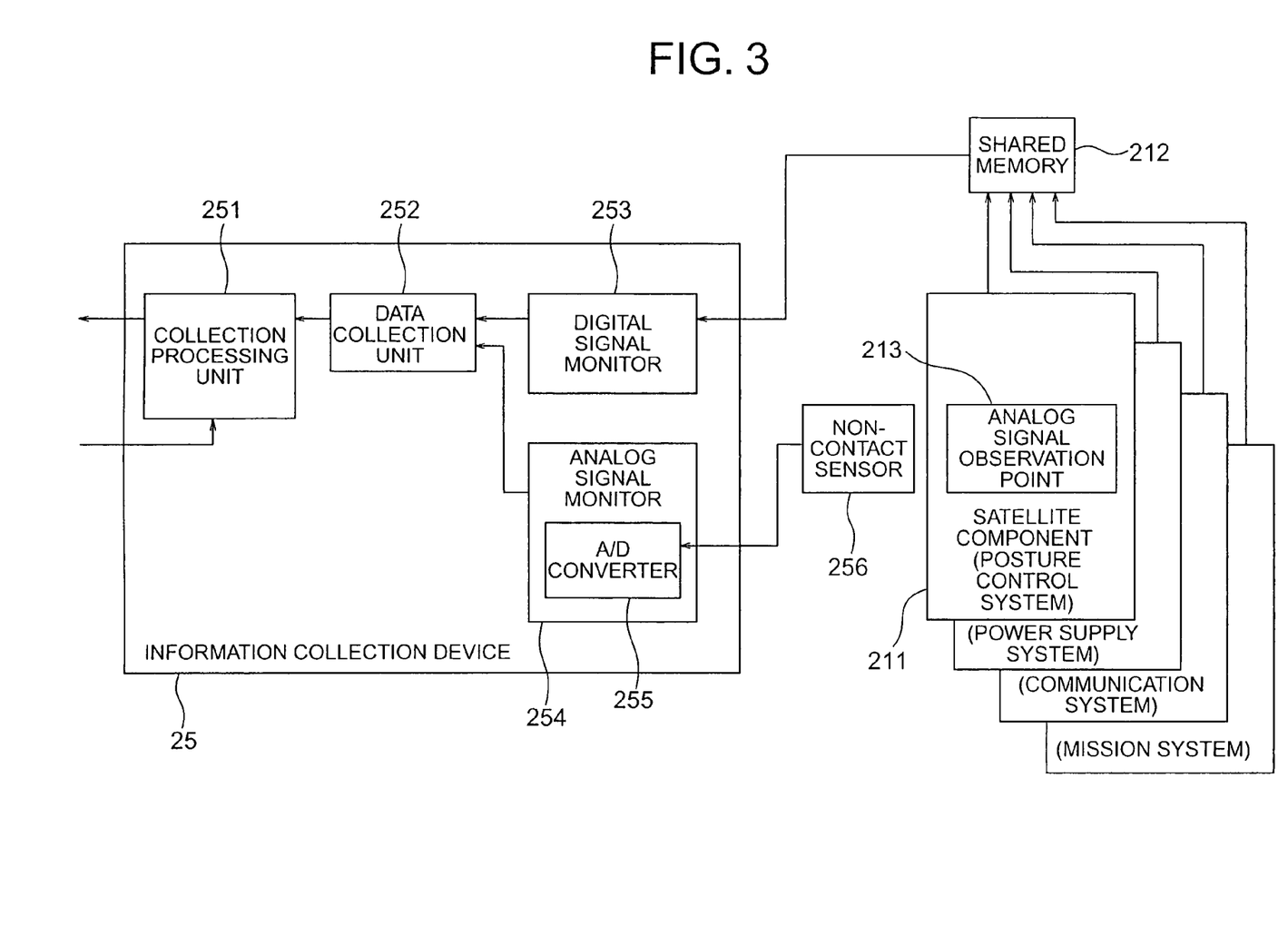
FIG. 3 is a view illustrating a satellite information collection system of the present invention.

The satellite bus system 21 comprises various devices (or components) for implementing the function (mission) of the satellite 2 and the functions accompanying this, or, as shown in FIG. 3, comprises a plurality of components 211. The first power supply 22 is for operating the (plurality of components 211) of the satellite bus system 21 and comprises, for example, a solar cell or a storage cell (battery) for storing electrical power generated by a solar cell. As shown in FIG. 3, the plurality of components 211 comprises a posture control system, a power supply system, a communication system and a mission system, for example. In reality, the first power supply 22 is one component of the plurality of components 211.

At the satellite tag system 23, the (second) power supply 24 is provided independently from the first power supply 22 and comprises, for example, a solar cell and a storage cell (battery) for storing electrical power generated by the solar cell. The second power supply 24 is smaller than the first power supply 22. It is therefore possible for the second power supply 24 to continue supplying power to the satellite tag system 23 even when obstacles or inconveniences occur at the first power supply 22 and/or satellite bus system 21 and it is therefore possible for the satellite tag system 23 to continue to operate.

The information collection device 25 is operated by the second power supply 24 and is provided to be independent from the satellite bus system 21, and collects and stores attribute information for the satellite 2. The attribute information for the satellite 2 includes, for example, identification information for the satellite 2 and attribute information for the satellite bus system 21. The identification information for the satellite 2 is, for example, a unique identification number assigned to the satellite 2, and is held in (a prescribed position of) shared memory 212. As a result, it is possible to specify various information (for example, the launch orbit 100, thrust, function, history, models etc.). The attribute information for the satellite bus system 21 is information such as, for example, voltage, current, temperature, and status information (position, speed etc. of the satellite 2) for the satellite 2. Further, the attribute information for the satellite bus system 21 may be, for example, images (for example, images of a typhoon etc. of a weather satellite, etc.) taken by a camera, or flight data for immediately before a breakdown.

In this example, the information collection device 25 collects attribute information from each of the plurality of components 211. Because of this, the information collection device 25 of this example is equipped with a digital signal monitor 253 and an analog signal monitor 254, as shown in FIG. 3. The digital signal monitor 253 reads digital data for the satellite bus system 21, especially, the content of a (prescribed position) of shared memory 212 of the plurality of components 211 of the satellite bus system 21. The plurality of components 211 write their own attribute information to (a prescribed position of) the shared memory 212. The attribute information it is intended to write is decided in advance for each of the plurality of components 211. Each of the plurality of components 211 may also be provided with memory. The analog signal monitor 254 reads analog data of the satellite bus system 21 using a non-contact type sensor 256. Specifically, the non-contact type sensor 256 is part of the information collection device 25 but is provided so as to correspond with an analog signal observation point 213. The analog signal observation point 213 is an observation point for reading current and temperature etc. of the plurality of components 211 of the satellite bus system 21. Appropriate unit are used as the non-contact type sensor 256 according to the data such as that of an ammeter or thermocouple etc.

The analog signal monitor 254 of this example is equipped with an A/D converter 255. In this way, the analog signal monitor 254 actually converts analog data read-out from the analog signal observation point 213 to digital data for output (to a data collection section 252).

In this example, the information collection device 25 is equipped with a collection processing unit 251 and the data collection section 252. The collection processing unit 251 reads out data (attribute information) to be read out individually cyclically (repeatedly) in fixed time periods at the digital signal monitor 253 and analog signal monitor 254 and outputs this data to the data collection section 252. The reading may be carried out at a prescribed timing (for example, in the case of detecting operation of a light load mode described later). When the data collection section 252 receives digital data (attribute information) from the digital signal monitor 253 and analog signal monitor 254, the digital data is held in a prescribed position of this memory (not shown). It is also possible to discard normal data. When the collection processing unit 251 receives a prescribed control signal from the light receiver 26, as described later, attribute information held by the data collection section 252 at this time is read out and inputted to (a modulation control unit 273) of the reflecting type light modulating device 27. The read-out data can then be deleted from the memory.

The light receiver 26 is operated by the second power supply 24 and is provided independently from the satellite bus system 21. When receiving prescribed light 200 sent from the terrestrial station 1, the light receiver 26 forms a prescribed control signal and inputs it to the information collection device 25 in this example. The light receiver 26 comprises, for example, a CCD (charge coupled device). The light receiver 26 is provided next to the reflecting type light modulating device 27 and utilizes a slight divergence of θ (for example, 50μ radians) irradiated at the reflecting type light modulating device 27 so as to utilize the light 200 in forming of the control signal. The light receiver 26 does not have a function for tracking the terrestrial station 1 and is therefore capable of autonomous communication using only a small amount of electrical power after breakdown of the satellite bus system 21.

The reflecting type light modulating device 27 is operated by the second power supply 24 and is provided indecently from the satellite bus system 21 so as to transmit reflected light modulated by superimposition of a modulation signal on the reflected waves of the light 200 in the case where prescribed light 200 sent from the terrestrial station 1 is received. In the case where a modulation signal is formed (i.e. in cases where the control signal is inputted), the reflecting type light modulating device 27 sends reflected light for which attribute information is superimposed with prescribed light 200 using the modulation signal. At the modulation control unit 273, as described previously, the modulation signal is formed based on attribute information stored in the information collection device 25 according to the forming of a control signal occurring at the light receiver 26. When attribute information does not exist, the modulation signal is not formed or is taken to be a prescribed signal that is a meaningless modulation signal.

The reflecting type light modulating device 27 comprises a spatial light modulator 271 for modulating incident light, a light reflector (CCR) 272 for reflecting light in the direction of the incident light, and a modulation control unit 273 for inputting a modulated signal to the spatial light modulator 271. (Information including) attribute information for the satellite 2 is therefore inputted to the spatial light modulator 271. In this way, an optical signal 200 sent from the terrestrial station 1 is modulated, and is then returned to the terrestrial station 1 from which it was originally sent, as shown in FIG. 1. As a result, it is possible to be aware of attribute information for the satellite 2 from the ground. The modulation control unit 273 may also be part of the information collection device 25.

It is possible to eliminate the need for an active electrical transmission device that consumes a large amount of power by using the reflecting type light modulating device 27 as the communication means for the satellite tag system 23. In this way, autonomous communication can be maintained with a small amount of power after breakdown etc. of the satellite bus system 21, and the attribute information can be transmitted and received passively with receiving of communication from outside of the satellite 2 as a trigger. Further, by using optical communication, it is possible to communicate with the satellite 2 over long distances without placing restrictions on wireless communication, and to communicate fast and secure. It is also possible to make the communication protocol more secure by carrying out authentication of the terrestrial station 1.

For example, by tracking the (reflecting type light modulating device 27 and light receiver 26 of the) satellite 2 and irradiating the laser light 200 at all time from the terrestrial station 1, it is possible to obtain attribute information continuously in real time. Further, by irradiating the laser light 200 cyclically at fixed time intervals, it is possible to obtain the attribute information at this time or the attribute information consecutively stored in memory. Further, it is also possible to only obtain abnormal attribute information at the times of performing cyclic radiation of laser light 200 by accumulating only abnormal attribute information in memory (not shown) of the data collection section 252.

It is desirable for the following to be employed as the reflecting type light modulating device 27. For example, at Utah State University in the USA in September 1996, experiments were carried out using a reflecting type light modulating communication device (system) employing a modulator using a 2.5 cm diameter, 28 Kg liquid crystal. The transmission speed in a communication test over 34 km using a balloon is 1,200 bits/s, and data transmission was successful with a signal that was RS232C compatible. Using a 1.5 m telescope of a Starfire optical terrestrial station, a laser is transmitted at an output of 5 W. wavelength of 810 nm, and beam divergence of 50µ radians (C. M. Swenson and C. A. Steed, "Low Power FLC-based Retromodulator Communications System," Proc. SPIE, Vol. 2990, pp. 296-310, 1997).

Further, a reflecting type modulation communication device (system) employing MQW (Multiple Quantum Wells) has also been proposed by the US army. unmanned craft space probe (G. C. Gilbreath, et. al., "Large-Aperture Multiple Quantum Well Modulating Retroreflector for Free-Space Optical Data Transfer on Unmanned Aerial Vehicles", Optical Engineering Vol. 40, no. 7, pp. 1348-1356, July 2001) can also be considered for applications in transmitting information loaded on unmanned crafts or space probes utilizing MQW capable of modulation at high speeds of a certain extent as a modulation device.

The reflecting type light modulating device 27 described above is comparatively small in appearance at only a few tens of centimeters across and can therefore easily be built into the satellite 2. The light receiver 26 is also similarly small, and can easily be mounted on the satellite 2.

The reflecting type light modulating device 27 may also be provided as a device in combination with a well-known liquid crystal and the light reflector 272. In this event, a small type device is obtained for which speed is slow but power consumption is also low. Further, this may also be a device where a well-known high-speed light modulator and light reflector 272 are provided in combination. In this event, high-speed communication is possible. Moreover, in this case, it is possible to implement a flexible device such as a cats eye capable of reflecting light as is in the direction of the incident light. The device may also be a device employing a photoreflective (phase conjugation) device in place of the light reflector 272. Further, the device may be a device in combination with an optical amplifier function in the reflecting type light modulating device 27.

In the above, in the satellite information collection system of the present invention, even if the satellite bus system 21 of the satellite 2 breaks down, the information collection device 25 collects and stores attribute information of the satellite 2, the light receiver 26 forms a control signal according to incident light of the laser light 200, and the reflecting type light modulating device 27 sends reflected light that is the prescribed light 200 with attribute information superimposed using the modulation signal when the modulation signal is formed based on attribute information stored in the information collection device 25 according to forming of the control signal. As a result, it is possible to obtain attribute information for the satellite 2 after the satellite bus system 21 breaks down.

As a result, it is possible to obtain the state of the satellite 2 which has, for example, failed, as attribute information, and research into the failure of the satellite 2 in the orbit 100, the specific causes of which mostly had to be assumed up until this time, can be carried out. Further, in addition to the risk element (frequency, giantism, instability of statistical basis) of dangers in space insurance, it is possible to improve such actuality that "damage conditions cannot actually be seen when an accident has occurred", and this can be conducive to drawing a learning curve.

Figure 4:
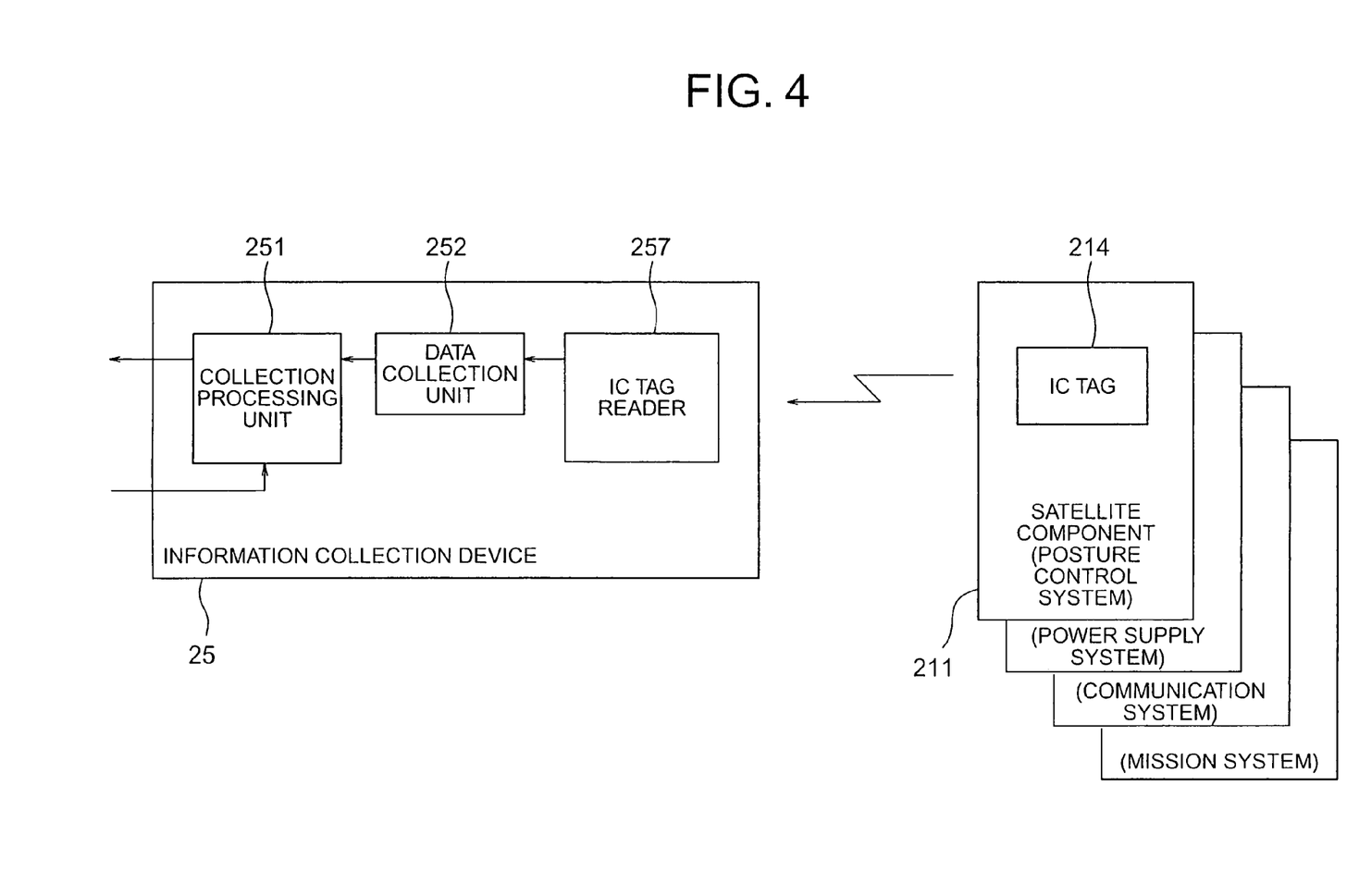
FIG. 4 is a view illustrating a satellite information collection system of the present invention.

FIG. 4 is a further view of a structure for a satellite information collection system, and shows a structure for a further satellite information collection system of the present invention. FIG. 4 is a view corresponding to FIG. 3 and shows a structure for the satellite 2.

In the example in FIG. 4, the information collection device 25 collects attribute information using non-contact information collection means from the plurality of components 211. In this example, a well-known IC tag (RFID) system is provided as the non-contact information collection system.

Namely, each of the plurality of components 211 is provided with an IC tag 214 as non-contact information collection means, and attribute information for the components 211 is written to the IC tags 214. The attribute information it is intended to write is decided in advance for each of the plurality of components 211. The IC tag 214 is a non-battery type and is taken to be the size of, for example, a well-known IC chip. As a result, the IC tag 214 is capable of operating based on electromagnetic radiation received from the IC tag reader 257 and it is therefore possible to obtain attribute information after breakdown of the satellite bus system 21. The information collection device 25 is equipped with an IC tag reader 257 taken as non-contact information collection means. The IC tag reader 257 reads out attribute information for the components 211 written into the IC tags 214 from each of the IC tags 214 of the plurality of components 211 either in a cyclic manner at fixed time intervals or at a prescribed timing, according to the instruction of the collection processing unit 251.

Figure 5:
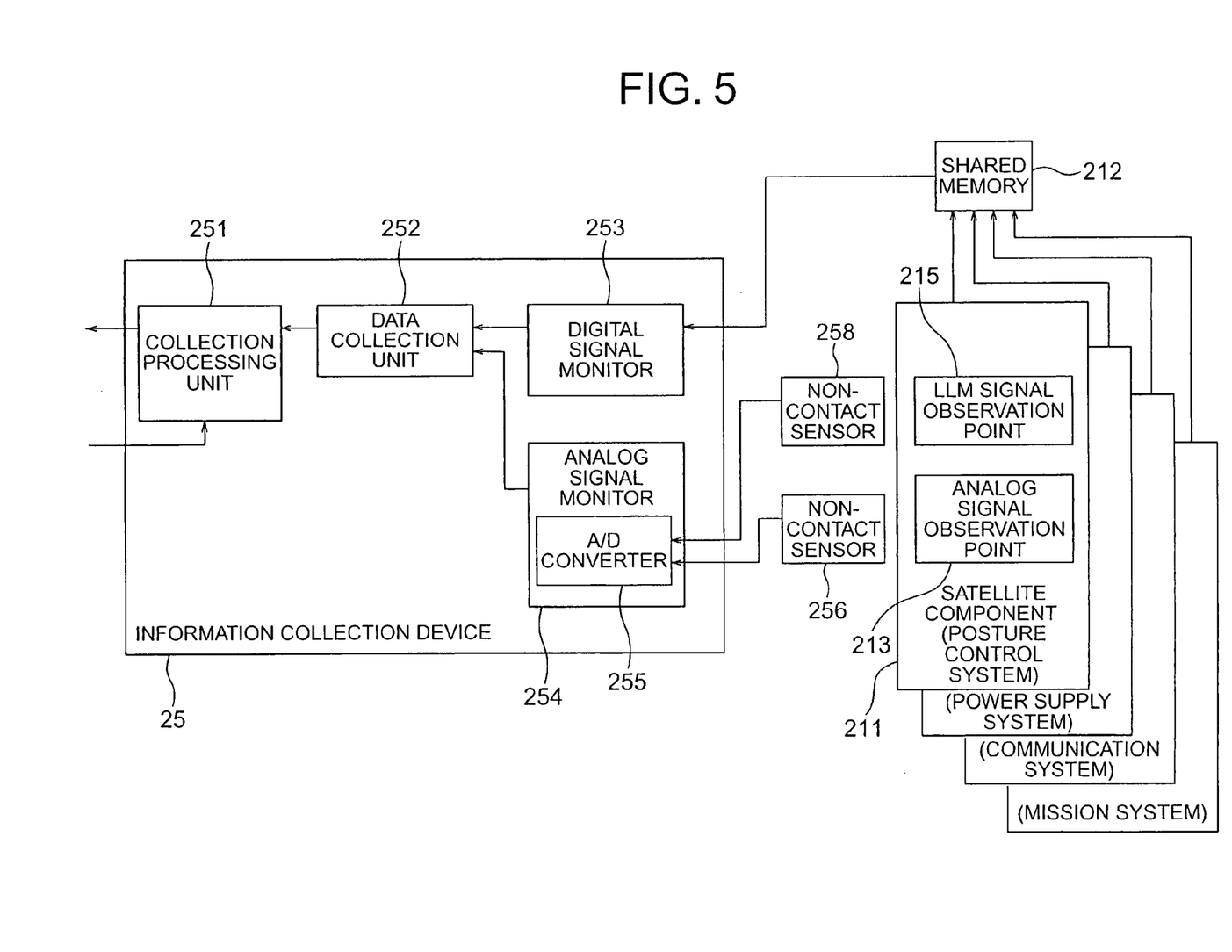
FIG. 5 is a view illustrating a satellite information collection system of the present invention.

FIG. 5 is a further view of a structure for a satellite information collection system, and shows a structure for a further satellite information collection system of the present invention. FIG. 5 is a view corresponding to FIG. 3 and shows a structure for the satellite 2.

In the example in FIG. 5, the (collection processing unit 251 of the) information collection device 25 collects attribute information for the satellite bus system 21 operating in light load mode when it is detected that the satellite bus system 21 is operating in light load mode (LLM). Because of this, the information collection device 25 is equipped with a non-contact sensor 258 for detecting a signal (LLM signal) for light load mode. The LLM signal is formed when an abnormality occurs with the generated electrical power or power consumption. The non-contact sensor 258 is provided to correspond with an LLM signal observation point 215, monitors the observation bus system 21, and detects the outputted LLM signal. The LLM signal observation point 215 is an observation point on wiring for sending an LLM signal at a component 211 for the power supply system. A current detector which comprises an electromagnetic coil or the like may be used as the non-contact sensor 258, for example.

As described above, the output of the non-contact sensor 258 is inputted to the data collection unit 252 and stored in a prescribed position of the memory. The collection processing unit 251 checks the writing to the prescribed position at prescribed periods. When an LLM signal is written in, from then onwards, data (attribute information) to be read out at the digital signal monitor 253 and the analog signal monitor 254 is read out in prescribed periods, sent to the data collection unit 252 and stored in a prescribed position, as described above, by the collection processing unit 251.

In this example, at the information collection device 25, the collection processing unit 251 diagnoses the satellite bus system 21. Namely, the information collection device 25 activates a diagnoses routine (not shown) for the collection processing unit 251 when it is detected that the satellite bus system 21 is operating in light load mode. The diagnosis routine diagnoses the satellite bus system 21 when activated by the collection processing unit 251 and also collects diagnosis information constituting these results (as attribute information). As described above, the diagnosis information comprises data stored at a prescribed position of the data editor 252 from when the LLM signal is written onwards.

In the above, even when the satellite bus system 21 is operating in low load mode, the information collection device 25 collects and stores attribute information for the satellite 2, the light receiver 26 forms a control signal, and the reflecting type light modulating device 27 sends reflected light that is the prescribed light 200 with attribute information superimposed using the modulation signal when the modulation signal is formed based on attribute information stored in the information collection device 25 according to forming of the control signal.

Figure 6:
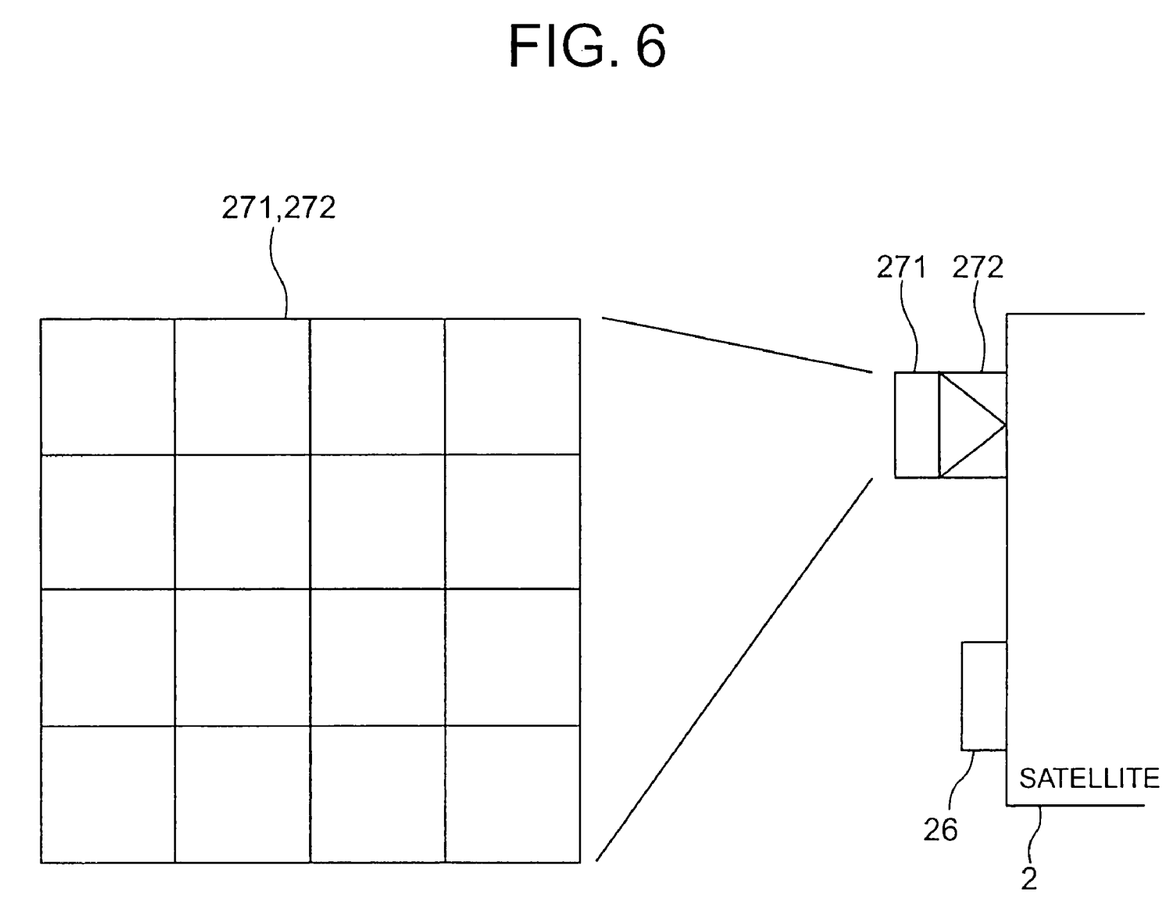
FIG. 6 is a view illustrating a further satellite information collection system of the present invention.

FIG. 6 is a further view of a structure for a satellite information collection system, and shows a structure for a further satellite information collection system of the present invention. Namely, FIG. 6 mainly shows, in enlarged form, a structure for a side surface (surface where the spatial light modulator 271, light reflector 272 and light receiver 26 are provided) of the satellite 2.

In the example in FIG. 6, a plurality of elements comprising a spatial light modulator 271 and light reflector 272 are lined up in the form of a matrix. In this way, it is possible to make the surface area for receiving light irradiated from the terrestrial station 1 large, tracking of the satellite 2 can be carried out in a straightforward manner, and more accurate attribute information can be obtained.

Figure 7:
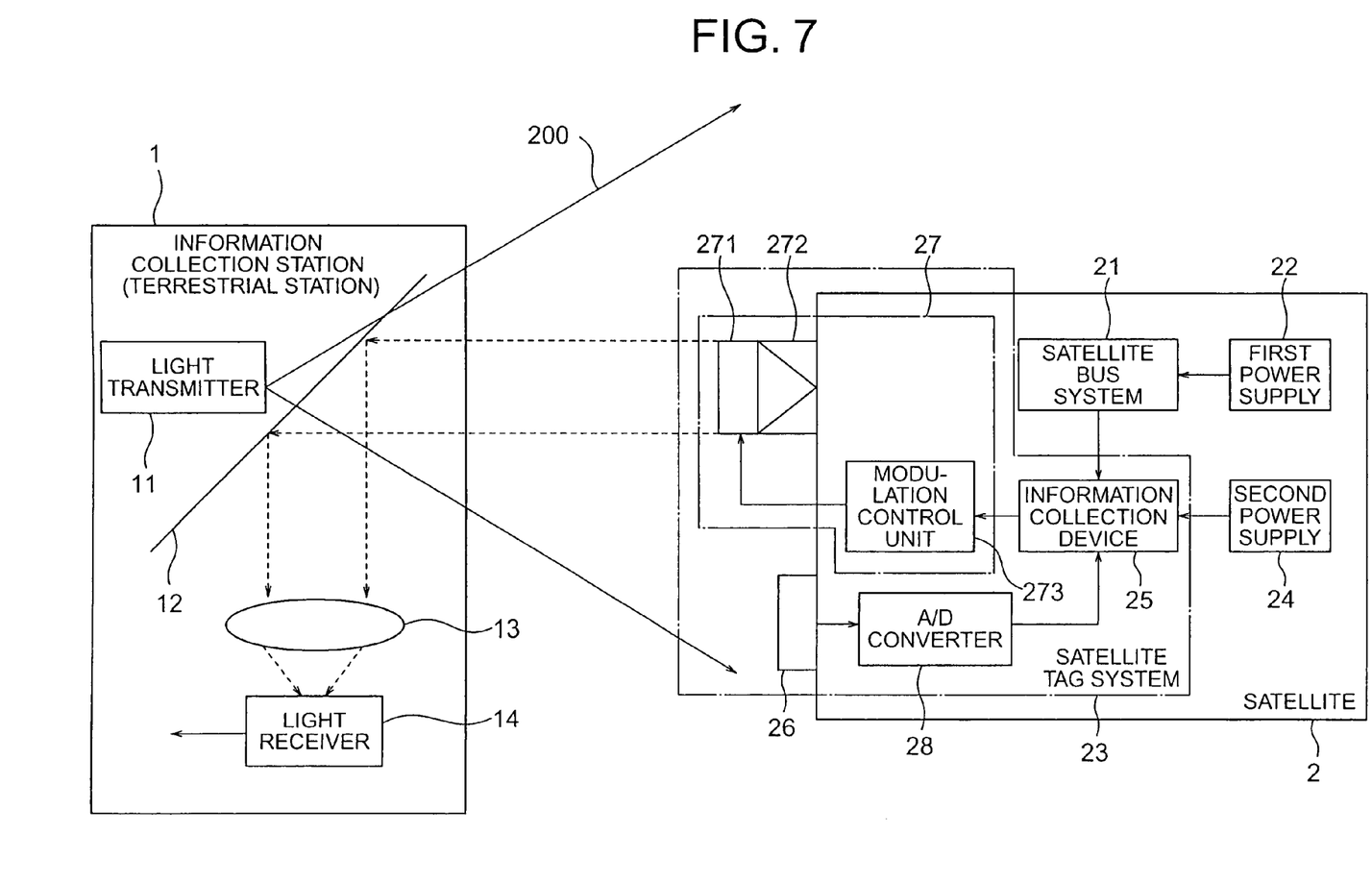
FIG. 7 is a view illustrating a further satellite information collection system of the present invention.

FIG. 7 is a further view of a structure for a satellite information collection system, and shows a structure for a further satellite information collection system of the present invention. FIG. 7 is a view corresponding to FIG. 1 and shows a structure for the satellite 2.

In the example in FIG. 7, the reflecting type light modulating device 27 converts the data transmission speed according to the intensity of the received light when prescribed light 200 irradiated from the terrestrial station 1 is received. Because of this, the signal outputted by the light receiver 26 is A/D converted by the A/D converter 28 and the intensity of the received signal is obtained. The (collection processing unit 251 of the) information collection device 25 makes the data transfer speed fast when the intensity of the received light is strong because the distance is short. Namely, the modulation frequency of the modulation signal is increased. Further, the (collection processing unit 251 of the) information collection device 25 makes the data transfer speed slow when the intensity of the received light is weak because the distance is long. Namely, the modulation frequency of the modulation signal is reduced. In this way, it is possible to transfer data reliably at as high a speed as possible.

Figure 8:
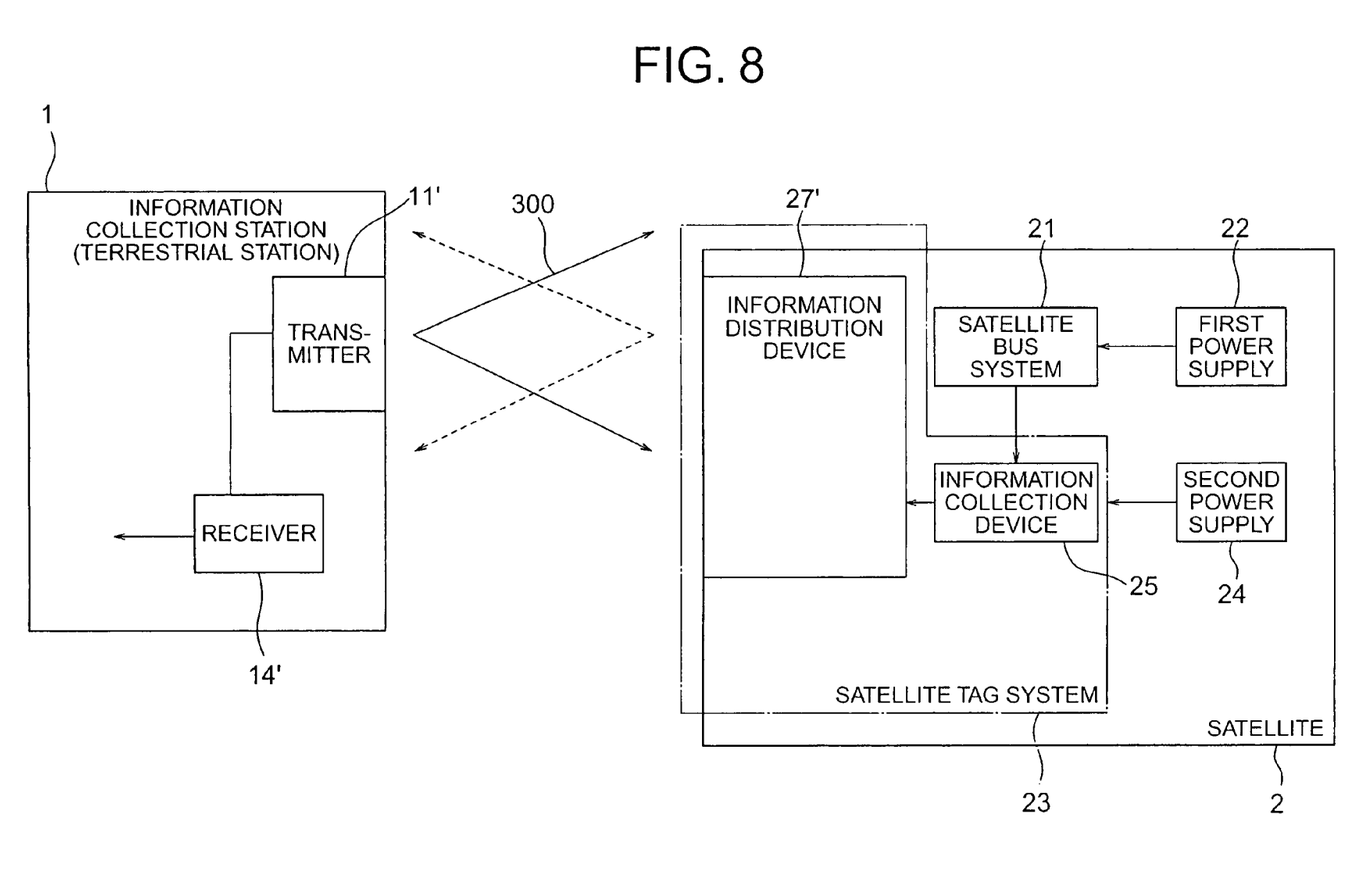
FIG. 8 is a view illustrating a further satellite information collection system of the present invention.

FIG. 8 is a further view of a structure for a satellite information collection system, and shows a structure for a further satellite information collection system of the present invention. FIG. 8 is a view corresponding to FIG. 1 and shows a structure for the satellite 2.

In the example in FIG. 8, an information distribution device 27' is operated by the second power supply 24 and is provided independently from the satellite bus system 21, and transmits a signal containing attribute information stored in the information collection device 25 by communication using a radio wave, for example, the microwave band. In other words, microwaves 300 of a prescribed wavelength are radiated in the direction of the (information distribution device 27' of the) satellite 2, in place of the irradiation of the laser light 200 in the example of FIG. 1. The information distribution device 27' superimposes a signal containing attribute information on reflected waves of the microwaves 300 using the same theory as for the IC tag system and sends back to the terrestrial station 1 irradiating the microwaves 300. In this way, it is possible to send attribute data to the terrestrial station 1 using irradiation of the microwaves 300 from the terrestrial station 1.

It is also possible to irradiate the microwaves 300 from another satellite 2', not from the terrestrial station 1, in an orbit different to that of the orbit 100 of the satellite 2 described below. In this case, it is possible for communication with the microwaves 300 to be reliable because the completed communication distance can be made short. Further, it is also possible to irradiate short wavelength microwaves 300 that can be handled quasi-optically towards the (reflecting type light modulating device 27 and light receiver 26 of the) satellite 2 in place of irradiation with the laser light 200.

Figure 9:
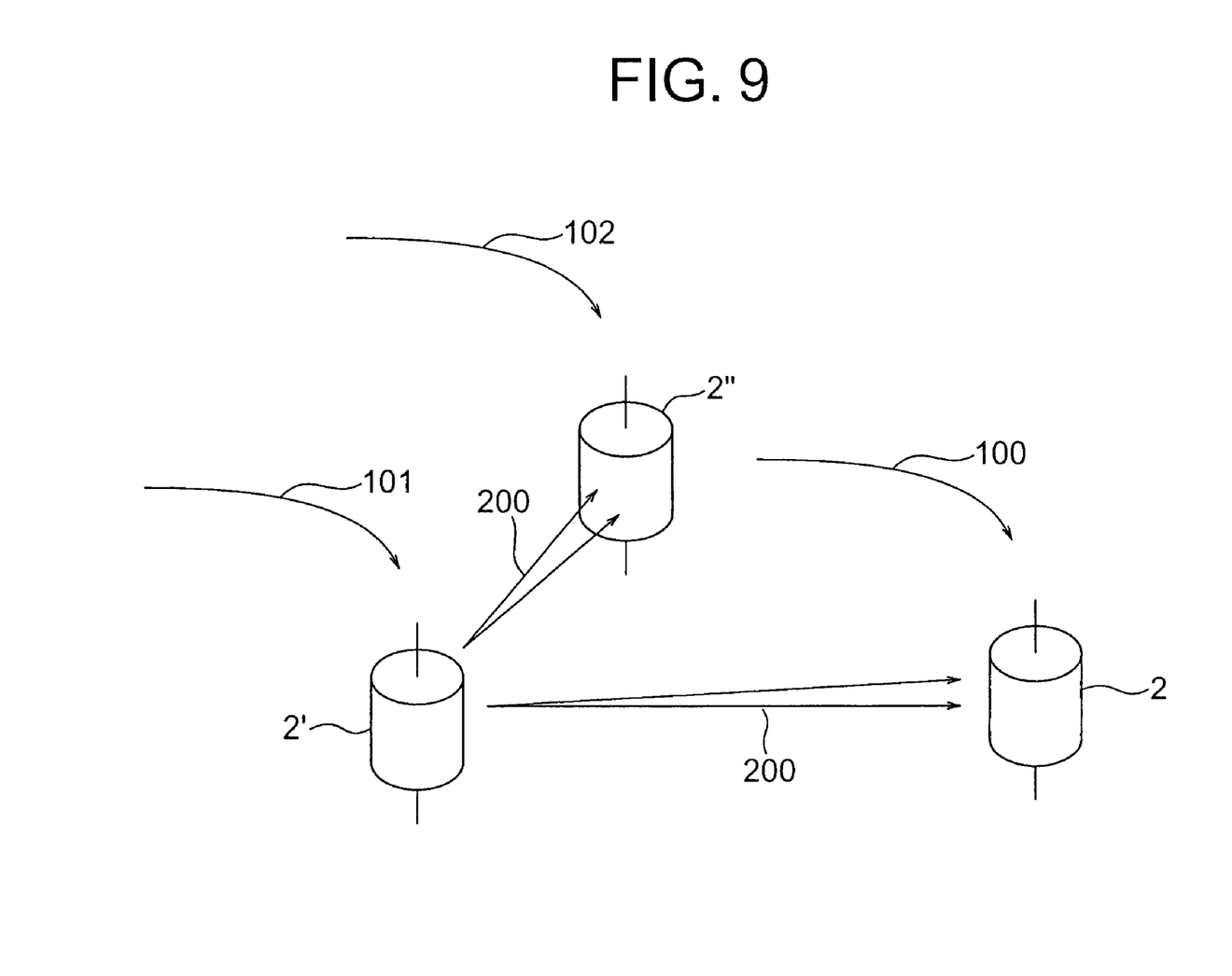
FIG. 9 is a view illustrating a further satellite information collection system of the present invention.

In the above description, as described in FIG. 1, a description is given (in the case of FIG. 2) of the case where the information collection station 1 is terrestrial (terrestrial station 1). As shown in FIG. 9, the information collection station 1 may also be provided at other satellite 2' on another orbit 101 separate from the orbit 100 of the satellite 2 (or the station 1 may be a satellite station 1). The other satellite 2' may be a maintenance satellite (or diagnosis satellite) of an orbit maintenance system (OMS) or may be a single satellite of a formation flight (a formation flight by a plurality of satellites 2).

When the other satellite 2' is a maintenance satellite, with the maintenance system in orbit, it is possible to obtain identification information and attribute information for the other satellite 2" (that has not broken down) in a separate orbit 102 from the (broken down) satellite 2. Diagnosis of the orbit is therefore possible and can be achieved in an effective manner. Further, when the other satellite 2' in the other orbit 101 is one of a number of satellites in formation flight, it is possible to obtain position information as attribute information for the satellite 2 and the satellite 2" that are in formation. It is therefore possible to carry out collision evasion control of the satellites flying in formation in a reliable manner, and optimization control of cooperating formation positions can be carried out. In this case, it is possible to achieve sharing of mutual position information by providing each of the formation flight satellites with the function of the present invention so that complete formation flight is possible. It is then possible to achieve the same flight by monitoring all of the attribute information for the formation flight satellites using the terrestrial station 1.

Figure 10:
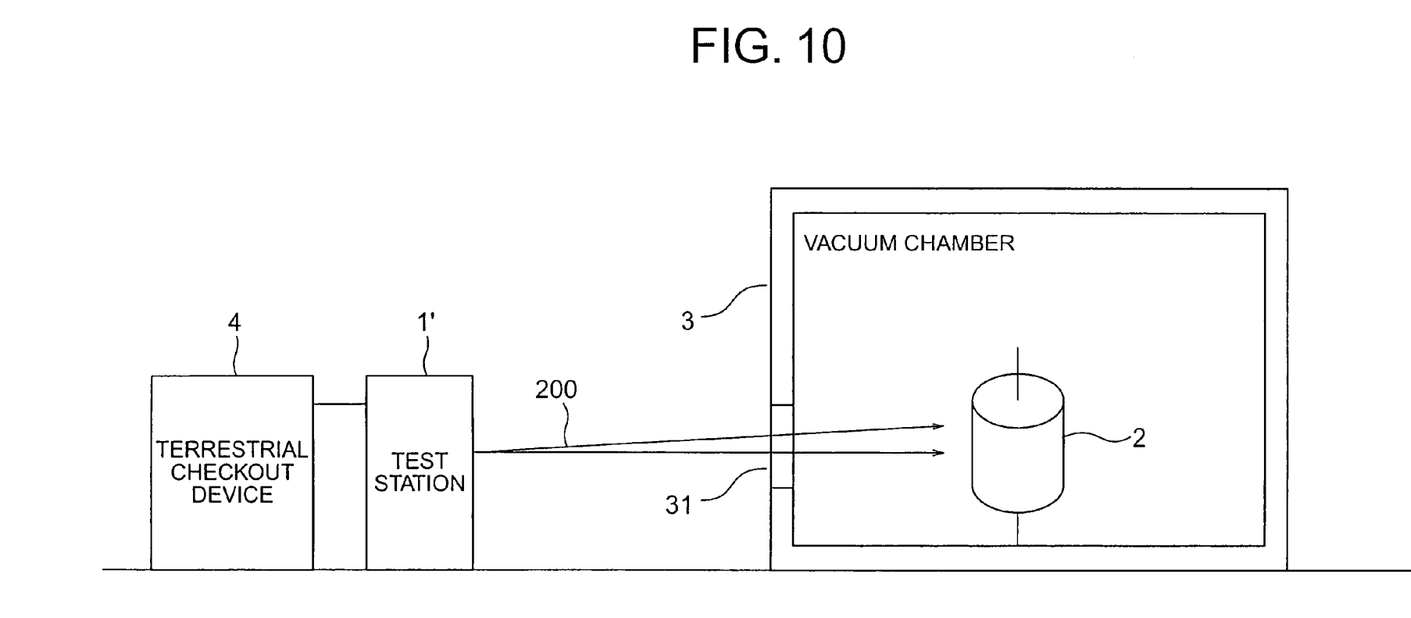
FIG. 10 is a view illustrating a further satellite terrestrial testing system of the present invention.

In the above, a description is given of after the satellite 2 is launched. However, as shown in FIG. 10, the present invention can also be applied to a satellite 2 prior to launch.

Namely, the present invention can also be applied to satellite terrestrial test systems (terrestrial check-out devices (AGE) 4). For example, a satellite terrestrial test system comprises a test station 1', satellite 2 prior to launch, and terrestrial check-out device 4. The test station 1' is connected to the terrestrial check-out device 4, and attribute information from the satellite 2 is sent to the terrestrial check-out device 4. The test station 1' corresponds to the terrestrial station 1. That is, the test station 1' has the same structure as the terrestrial station 1. The satellite 2 is a satellite 2 (satellite 2 of FIG. 1) prior to being launched.

In this example, the test station 1' irradiates the satellite 2 with prescribed light (laser light) 200 via a transparent window 31 of a vacuum chamber 3. The light receiver 26 forms a prescribed control signal and inputs this control signal to the reflecting type light modulating device 27 when prescribed light 200 is sent from the test station 1'. Because of this, as shown in FIG. 10, for example, within the vacuum chamber 3, the satellite 2 is positioned facing the test station 1' outside the vacuum chamber 3, and is made to operation in a manner required to perform terrestrial tests.

As a result, mechanical wiring is not required at the terrestrial check-out device 4 of the satellite 2, so that the test equipment such as the test station 1' and vacuum chamber 3 etc. can be used in common by any satellite 2. By make the communication interface for the optical communication in common thus described as well as a protocol for the communication in common, it is possible to unify the terrestrial check-out device 4 which had been developed for every satellite 2.

A description is given according to embodiments of the present invention but various modifications of the present invention are possible without deviating from spirit of the invention. For example, the present invention is by no means limited to a satellite 2 in an orbit 100 or a satellite 2 prior to launch, and may be applied to a typical satellite. Further, the present invention may also be applied to an orbiting space station or a planetary space station.

As described above, according to the present invention, at the satellite information autonomous distribution satellite and satellite information collection system, it is possible to obtain sufficient attribute information using high-speed optical communication with the satellite in a normal operating state. It is therefore possible to carry out accurate analysis until failure or damage occurs and increase the possibility that the failure etc. can be overcome. Further, because it is possible to obtain attribute information for a satellite after failure or damage to the satellite has occurred even when means of communication are cut, it is possible to carry out extremely accurate analysis of the causes of a satellite failure. It is also possible to obtain attribute information for before and after the occurrence of failure for all satellites without recovering the satellite etc. for which the failure has occurred. Moreover, it is possible to obtain attribute information for satellites that have malfunctioned slightly but are still in orbit without salvaging the satellite so that recovery may then be possible based on this attribute information.

According to the present invention, in this satellite terrestrial test system, it is possible to obtain various data using optical communication with a satellite arranged within, for example, a vacuum chamber. It is therefore no longer necessary to make a connection with external test equipment using a cable or to provide different connection units for different cables for every satellite at the test device. This means that a common interface can be used for acquiring test data regardless of the type of satellite.

What is claimed is:

1. A satellite information autonomous distribution satellite comprising:
   a satellite bus system for a satellite;
   a first power supply to cause the satellite bus system to operate;
   a second power supply provided independently from the first power supply;
   an information collection device operated by the second power supply and provided independently from the satellite bus system, to collect and store attribute information for the satellite;
   a light receiver provided independently from the satellite bus system, to form a prescribed control signal when prescribed light is received; and
   a reflecting type light modulating device operated by the second power supply and provided independently from the satellite bus system, to transmit reflected light modulated by superimposing a modulation signal onto reflected waves of light when the prescribed light is received, the reflecting type light modulating device sending reflected light constituted by reflected light where the attribute information is superimposed on the prescribed light using the modulation signal when a modulation signal is formed based on the attribute information stored in the information collection device according to the forming of the control signal.

2. The satellite information autonomous distribution satellite according to claim 1, wherein the reflecting type light modulating device comprises a light reflector to reflect light in the direction of propagation of the light, and a spatial light modulator to modulate the incident light.

3. The satellite information autonomous distribution satellite according to claim 1, wherein the reflecting type light modulating device comprises a plurality of elements comprising a light reflector and a spatial light modulator lined up in a matrix.

4. The satellite information autonomous distribution satellite according to claim 1, wherein the reflecting type light modulating device changes data transmission speed according to intensity of received light when the prescribed light is received.

5. The satellite information autonomous distribution satellite according to claim 1, wherein the attribute information for the satellite contains identification information for the satellite and attribute information for the satellite bus system.

6. The satellite information autonomous distribution satellite according to claim 1, wherein the information collection device comprises a digital signal monitor to read out digital data for the satellite bus system and an analog signal monitor to read analog data for the satellite bus system using a non-contact sensor.

7. The satellite information autonomous distribution satellite according to claim 1,
   wherein the satellite bus system comprises a plurality of components, and
   wherein the information collection device collects attribute information from each of the plurality of components.

8. The satellite information autonomous distribution satellite according to claim 1, wherein the information collection device collects attribute information from each of the plurality of components using non-contact information collection unit.

9. The satellite information autonomous distribution satellite according to claim 8,
   wherein each of the plurality of components is provided with an IC tag as the non-contact information collection unit and attribute information for the component is written to the IC tag, and
   wherein the information collection device is provided with an IC tag reader as the non-contact information collection unit to read attribute information for the components written to the IC tags from each IC tag of the plurality of components.

10. The satellite information autonomous distribution satellite according to claim 1, wherein the information collection device collects attribute information for the satellite bus system operating in light load mode when it is detected that the satellite bus system is operating in low load mode.

11. The satellite information autonomous distribution satellite according to claim 1,
wherein the information collection device is equipped with a diagnosis processor to diagnose the satellite bus system, with the diagnosis processor being activated when the satellite bus system is detected to be operating in light load mode, and
wherein the diagnosis processor diagnoses the satellite bus system when activated by the information collection device and collects diagnosis information constituting the results.

12. The satellite information autonomous distribution satellite according to claim 10 or claim 11,
wherein the information collection device is equipped with a non-contact sensor to detect a signal for light load mode, and
wherein the non-contact sensor monitors the satellite bus system and detects output of the signal for the light load mode.

13. The satellite information autonomous distribution satellite according to claim 1,
wherein, in cases where the satellite bus system is operating in light load mode or the satellite system breaks down, the information collection device collects and stores attribute information for the satellite, the light receiver forms the control signal, and
wherein the reflecting type light modulating device sends reflected light constituted by reflected light where the attribute information is superimposed on the prescribed light using the modulation signal when a modulation signal is formed based on the attribute information stored in the information collection device according to the forming of the control signal.

14. A satellite information collection system comprising:
an information collection station further including:
a light transmitter to transmit prescribed light; and
a light receiver to receive reflected light resulting from the prescribed light being reflected by the satellite; and
a satellite in orbit further including:
a satellite bus system for the satellite;
a first power supply to cause the satellite bus system to operate;
a second power supply provided independently from the first power supply;
an information collection device operated by the second power supply and provided independently from the satellite bus system, to collect and store the attribute information for the satellite;
a light receiver provided independently from the satellite bus system, to form a prescribed control signal when the prescribed light is received; and
a reflecting type light modulating device operated by the second power supply and provided independently from the satellite bus system, to transmit reflected light modulated by superimposing a modulation signal onto reflected waves of light when the prescribed light is received, the reflecting type light modulating device sending reflected light constituted by reflected light where the attribute information is superimposed on the prescribed light using the modulation signal when a modulation signal if formed based on the attribute information stored in the information collection device according to the forming of the control signal.

15. A satellite terrestrial test system comprising:
a test station further including:
a light transmitter to transmit prescribed light; and
a light receiver to receive reflected light resulting from the prescribed light being reflected by the satellite; and
an un-launched satellite further including:
a satellite bus system for the satellite;
a first power supply to cause the satellite bus system to operate;
a second power supply provided independently from the first power supply;
an information collection device operated by the second power supply and provided independently from the satellite bus system, to collect and store the attribute information for the satellite;
a light receiver provided independently from the satellite bus system, to form a prescribed control signal when the prescribed light is received; and
a reflecting type light modulating device operated by the second power supply and provided independently from the satellite bus system, to transmit reflected light modulated by superimposing a modulation signal onto reflected waves of light when the prescribed light is received, the reflecting type light modulating device sending reflected light constituted by reflected light where the attribute information is superimposed on the prescribed light using the modulation signal when a modulation signal is formed based on the attribute information stored in the information collection device according to the forming of the control signal.

16. A satellite terrestrial test system according to claim 15,
wherein the satellite is positioned facing the test station, and
wherein the reflecting type light modulating device comprises a light reflector to reflect light in the direction of propagation of the light, and a spatial light modulator to modulate the incident light.

* * * * *

UNITED STATES PATENT AND TRADEMARK OFFICE
CERTIFICATE OF CORRECTION

| | |
|---|---|
| PATENT NO. | : 7,627,255 B2 |
| APPLICATION NO. | : 11/177438 |
| DATED | : December 1, 2009 |
| INVENTOR(S) | : Morio Toyoshima et al. |

It is certified that error appears in the above-identified patent and that said Letters Patent is hereby corrected as shown below:

Column 16, Line 10, after "signal" change "if" to --is--.

Column 16, Line 43, change "A" to --The--.

Signed and Sealed this

Sixteenth Day of March, 2010

David J. Kappos
*Director of the United States Patent and Trademark Office*